US012781101B2

(12) United States Patent
Yuan et al.

(10) Patent No.: US 12,781,101 B2
(45) Date of Patent: Nov. 3, 2026

(54) PROTECTIVE MEMBRANE AND ADHESIVE COMPOSITION

(71) Applicant: NAN YA PLASTICS CORPORATION, Taipei (TW)

(72) Inventors: Ching-Yao Yuan, Taipei (TW); Wei-Sheng Cheng, Taipei (TW); Wen-Ta Cheng, Taipei (TW); Nei-Mei Fang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 260 days.

(21) Appl. No.: 18/754,113

(22) Filed: Jun. 25, 2024

(65) Prior Publication Data

US 2025/0340758 A1 Nov. 6, 2025

(30) Foreign Application Priority Data

May 2, 2024 (TW) ................................ 113116303

(51) Int. Cl.
*C09J 7/40* (2018.01)
*C09J 133/08* (2006.01)

(52) U.S. Cl.
CPC ............... *C09J 7/40* (2018.01); *C09J 133/08* (2013.01); *C09J 2301/312* (2020.08); *C09J 2301/408* (2020.08); *C09J 2301/414* (2020.08)

(58) Field of Classification Search
CPC ......... C09J 7/40; C09J 7/38; C09J 7/30; C09J 2301/122; C09J 2301/312; C09J 2301/408; C09J 2301/414; C09J 133/08; C08F 220/1808
USPC ........................................................ 156/289
See application file for complete search history.

(56) References Cited

U.S. PATENT DOCUMENTS

| | | | |
|---|---|---|---|
| 2020/0048499 A1 | 2/2020 | Andou et al. | |
| 2024/0117177 A1 | 4/2024 | Shiotani et al. | |
| 2024/0191106 A1* | 6/2024 | Akai | B32B 27/308 |

FOREIGN PATENT DOCUMENTS

| | | |
|---|---|---|
| CN | 110546224 A | 12/2019 |
| CN | 116396451 A | 7/2023 |
| JP | 200874976 A | 4/2008 |
| JP | 2008174595 A | 7/2008 |
| JP | 2008248223 A | 10/2008 |
| JP | 201152117 A | 3/2011 |
| JP | 2013199562 A | 10/2013 |
| JP | 2014114344 A | 6/2014 |

(Continued)

*Primary Examiner* — James D Sells
(74) *Attorney, Agent, or Firm* — Li & Cai Intellectual Property Office

(57) ABSTRACT

A protective membrane and an adhesive composition are provided. The adhesive composition includes an acrylic block copolymer, a crosslinker, and a catalyst. Relative to 100 parts by weight of acrylic block copolymer, an amount of the crosslinker ranges from 1 part by weight to 10 parts by weight and an amount of the catalyst ranges from 0.001 parts by weight to 0.05 parts by weight. The acrylic block copolymer is synthesized from a methacrylic monomer, an acrylic monomer, and a hydroxyl monomer through free radical two-stage polymerization. A glass transition temperature of a homopolymer formed from the methacrylic monomer is higher than a glass transition temperature of a homopolymer formed from the acrylic monomer. The acrylic block copolymer contains an A block segment and a B block segment.

15 Claims, 1 Drawing Sheet

(56) References Cited

FOREIGN PATENT DOCUMENTS

| | | | |
|---|---|---|---|
| JP | 201683939 | A | 5/2016 |
| JP | 2016155942 | A | 9/2016 |
| JP | 202083939 | A | 6/2020 |
| TW | 201834044 | A | 9/2018 |
| WO | WO2014020867 | A1 | 2/2014 |

* cited by examiner

PROTECTIVE MEMBRANE AND ADHESIVE COMPOSITION

CROSS-REFERENCE TO RELATED PATENT APPLICATION

This application claims the benefit of priority to Taiwan Patent Application No. 113116303, filed on May 2, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protective membrane and an adhesive composition, and more particularly to a protective membrane which is used for a solder mask in an exposure process of a printed circuit board and an adhesive composition.

BACKGROUND OF THE DISCLOSURE

In a manufacturing process of a printed circuit board, various layers having precise structure are disposed on a substrate to form a laminate structure. Due to the complicated structure, a manufacturing time of the printed circuit board is long. In order to keep a surface of the printed circuit board clean and free of impurities, the surface of the printed circuit board can be covered by a transparent protective membrane.

The transparent protective membrane has a sufficient adhesive force so as to be attached onto a surface which is coated by a solder mask of a substrate in a soldering process. The substrate can directly undergo an exposure process, and the transparent protective membrane can be removed before proceeding with a developing process. Therefore, the transparent protective membrane needs to have a high light-transmittance, high peelability, and no remaining adhesive residue, thereby facilitating the performing of the exposure process.

In practical operation, the protective membrane can be evenly attached onto the solder mask which has been coated and baked onto the printed circuit board by heat-pressing at a temperature ranging from 50° C. to 80° C. After the exposure process, the protective membrane can be manually removed for the subsequent developing process.

Conventional adhesive layer is formed from polyacrylic resin. In addition, a peeling strength of the protective membrane will increase along with the increasing peeling rate. Therefore, when the protective membrane is peeled at a fast peeling rate, the peeling strength of the protective membrane is high, such that a part of the solder mask that has been exposed and cured may be removed along with the protective membrane, or the printed circuit board may be bent.

Accordingly, how to appropriately decrease the peeling strength of the protective membrane under the condition that the original adhesive effect is maintained, so as to overcome the disadvantages mentioned above, has become an important issue to be addressed in the relevant industry.

SUMMARY OF THE DISCLOSURE

In response to the above-referenced technical inadequacy, the present disclosure provides a protective membrane and an adhesive composition.

In order to solve the above-mentioned problems, one of the technical aspects adopted by the present disclosure is to provide an adhesive composition. The adhesive composition includes an acrylic block copolymer, a crosslinker, and a catalyst. Relative to 100 parts by weight of acrylic block copolymer, an amount of the crosslinker ranges from 1 part by weight to 10 parts by weight, and an amount of the catalyst ranges from 0.001 parts by weight to 0.05 parts by weight. The acrylic block copolymer is synthesized from a methacrylic monomer, an acrylic monomer, and a hydroxyl monomer through free radical two-stage polymerization. A glass transition temperature of a homopolymer formed from the methacrylic monomer is higher than a glass transition temperature of a homopolymer formed from the acrylic monomer. The acrylic block copolymer contains an A block segment and a B block segment.

In one of the possible or preferred embodiments, a glass transition temperature of the A block segment ranges from −40° C. to −10° C.

In one of the possible or preferred embodiments, a glass transition temperature of the B block segment ranges from 10° C. to 25° C.

In one of the possible or preferred embodiments, based on a total weight of the acrylic block copolymer being 100 wt %, an amount of the A block segment ranges from 10 wt % to 20 wt %, and an amount of the B block segment ranges from 80 wt % to 90 wt %.

In one of the possible or preferred embodiments, the glass transition temperature of the homopolymer polymerized from the methacrylic monomer ranges from 15° C. to 115° C., and the glass transition temperature of the homopolymer polymerized from the acrylic monomer ranges from −70° C. to 10° C.

In one of the possible or preferred embodiments, the methacrylic monomer is selected from the group consisting of: methyl methacrylate, ethyl methacrylate, n-butyl methacrylate, isobutyl methacrylate, glycidyl methacrylate, tert-butyl methacrylate, cyclohexyl methacrylate, and isobornyl methacrylate.

In one of the possible or preferred embodiments, the acrylic monomer is selected from the group consisting of: methyl acrylate, ethyl acrylate, 2-ethylhexyl acrylate, and n-butyl acrylate.

In one of the possible or preferred embodiments, the hydroxyl monomer is selected from the group consisting of: 2-hydroxyethyl acrylate and 2-hydroxyethyl methacrylate.

In one of the possible or preferred embodiments, the A block segment is formed from 5 wt % to 15 wt % of the methacrylic monomer, 75 wt % to 90 wt % of the acrylic monomer, and 5 wt % to 10 wt % of the hydroxyl monomer.

In one of the possible or preferred embodiments, the B block segment is formed from 25 wt % to 35 wt % of the methacrylic monomer, 45 wt % to 70 wt % of the acrylic monomer, and 5 wt % to 10 wt % of the hydroxyl monomer.

In one of the possible or preferred embodiments, a number average molecular weight of the acrylic block copolymer ranges from 300,000 g/mol to 500,000 g/mol.

In one of the possible or preferred embodiments, a polymer dispersity index of the acrylic block copolymer ranges from 1.5 to 5.

In order to solve the above-mentioned problems, another one of the technical aspects adopted by the present disclosure is to provide a protective membrane. The protective membrane includes a substrate layer, an adhesive layer, and a separating layer. The adhesive layer is formed from the adhesive composition mentioned above. The adhesive layer is disposed between the substrate layer and the separating layer.

In one of the possible or preferred embodiments, a thickness of the adhesive layer ranges from 2 μm to 20 μm.

In one of the possible or preferred embodiments, at an operating temperature of 25° C., a peeling strength of the protective membrane peeled at 0.3 m/min is higher than a peeling strength of the protective membrane peeled at 2.4 m/min.

Therefore, in the protective membrane and the adhesive composition provided by the present disclosure, by virtue of "the adhesive composition including the acrylic block copolymer which has the A block segment and the B block segment," and "the glass transition temperature of the A block segment being lower than the glass transition temperature of the B block segment," the protective membrane can have good adhesive force and can be peeled at a high peeling rate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
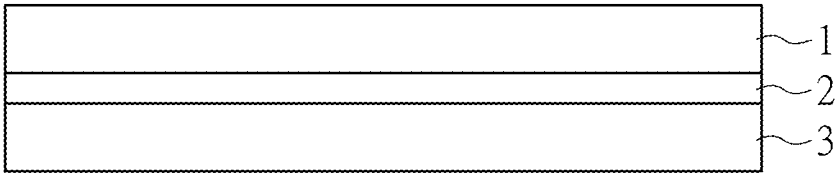
FIG. 1 is a schematic side view of a protective membrane according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to prevent a part of the solder mask from being peeled according with the protective membrane or the printed circuit board from being bent as separating the protective membrane, a protective membrane is provided by the present disclosure. An adhesive layer of the protective membrane is formed from an adhesive composition. The adhesive layer formed from the adhesive composition has a good adhesive force to be attached on a surface of the printed circuit board. In addition, the protective membrane has a low peeling strength when being peeled at a high peeling rate, so as to be easily separated therefrom.

Referring to FIG. 1, the protective membrane of the present disclosure includes a substrate layer 1, an adhesive layer 2, and a separating layer 3. The adhesive layer 2 is disposed between the substrate layer 1 and the separating layer 3.

In an exemplary embodiment, a thickness of the substrate layer 1 ranges from 10 μm to 50 μm, a thickness of the adhesive layer 2 ranges from 2 μm to 20 μm, and a thickness of the separating layer 3 ranges from 10 μm to 50 μm, but the present disclosure is not limited thereto. After experimental testing, when the thickness of the adhesive layer 2 ranges from 2 μm to 20 μm, a balance between the adhesive effect and the peeling strength of the protective membrane can be obtained, and the protective membrane can provide convenience in use.

In an exemplary embodiment, main materials of the substrate layer 1 and the separating layer 3 are polyethylene terephthalate (PET). The difference between the substrate layer 1 and the separating layer 3 is that a release agent is coated on a surface of the separating layer 3 so as to be easily separated from the adhesive layer 2.

Figure 2:
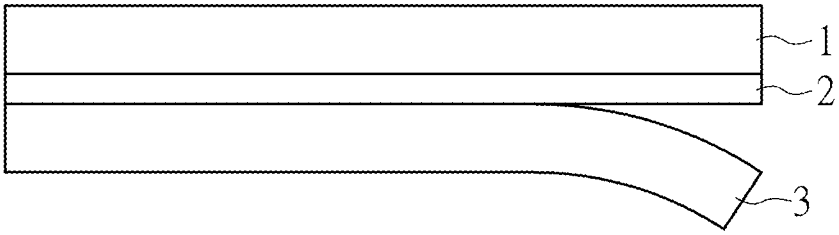
FIG. 2 is a first usage state of the protective membrane according to the present disclosure.
Figure 3:
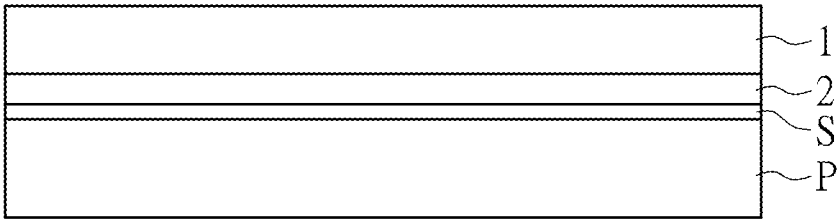
FIG. 3 is a second usage state of the protective membrane according to the present disclosure.

Referring to FIG. 2 and FIG. 3, before using the protective membrane, the separating layer 3 is separated first (FIG. 2). Subsequently, the adhesive layer 2 contacts the printed circuit board P which is coated by a solder mask S (also known as solder resist) (FIG. 3). After the disposition, the printed circuit board P and the protective membrane are heat-pressed at 60° C. by a roller for a better adhesion. Accordingly, the disposition of the protective membrane can prevent impurities from attaching onto the surface of the printed circuit board P and achieve a protection effect.

Since the protective membrane is light-transmitting, after the protective membrane further being covered by a photomask, the printed circuit board P can directly proceed with the exposure process so as to implement a pattern treatment to the solder mask S. As the pattern treatment is ended, the protective membrane can be directly peeled therefrom, which is convenient for the printed circuit board P for proceeding with other processes, such as a developing process. However, the above descriptions are only for illustrating the usage of the protective membrane, and the present disclosure is not limited thereto.

An adhesive composition which can be used as the adhesive layer of the protective membrane is provided by the present disclosure. The adhesive composition enables the protective membrane to have a good adhesive effect and has a low peeling strength at a high peeling rate (2.4 m/min). Specific data of the peeling strength are described below.

The adhesive composition of the present disclosure includes an acrylic block copolymer, a crosslinker, a solvent, and a catalyst. The adhesive composition can further include a plasticizer. The solvent will be evaporated during a process of the formation of the adhesive layer from the adhesive composition. Therefore, the material of the adhesive layer includes the acrylic block copolymer, the crosslinker, and the catalyst mentioned above, and can further include the plasticizer.

In the adhesive composition, the acrylic block copolymer is the main solid content of the adhesive composition. Relative to 100 parts by weight of the acrylic block copolymer, an amount of the crosslinker ranges from 1 part by weight to 10 parts by weight, an amount of the catalyst ranges from 0.001 parts by weight to 0.05 parts by weight, an amount of the solvent ranges from 50 parts by weight to 90 parts by weight, and an amount of the plasticizer ranges from 0.1 parts by weight to 5 parts by weight.

The acrylic block copolymer is polymerized from a methacrylic monomer, an acrylic monomer, and a hydroxyl monomer. The hydroxyl monomer is connected between the methacrylic monomer and the acrylic monomer.

In an exemplary embodiment, a number average molecular weight of the acrylic block copolymer ranges from 300,000 g/mol to 500,000 g/mol, such as 325,000 g/mol, 350,000 g/mol, 375,000 g/mol, 400,000 g/mol, 425,000 g/mol, 450,000 g/mol, or 475,000 g/mol. A polymer dispersity index (PDI) of the acrylic block copolymer ranges from 1.5 to 5, such as 2, 2.5, 3, 3.5, 4, or 4.5. When the number average molecular weight and the polymer dispersity index of the acrylic block copolymer are within the ranges above, the adhesive layer formed from the adhesive composition can have a low peeling strength at a high peeling rate.

It should be noted that the acrylic block copolymer of the present disclosure is polymerized through free radical two-stage polymerization. By adjusting a ratio of the methacrylic monomer to the acrylic monomer, the acrylic block copolymer can include the A block segment and the B block segment.

The difference between the A block segment and the B block segment is the glass transition temperature. A glass transition temperature of the A block segment is lower than a glass transition temperature of the B block segment. Specifically, the glass transition temperature of the A block segment ranges from −40° C. to −10° C. The glass transition temperature of the B block segment ranges from 10° C. to 25° C.

Supplementary explanation, the glass transition temperatures of the A block segment and the B block segment are calculated according to the FOX formula. In FOX formula, "Tg" is a glass transition temperature of a block copolymer, "$W_1$", "$W_2$", "$W_3$", . . . , and "$W_n$" are content of each monomer, and "$Tg_1$", "$Tg_2$", "$Tg_3$", . . . , and "$Tg_n$" are glass transition temperature of a homopolymer formed from each monomer.

$$1/Tg = W_1/Tg_1 + W_2/Tg_2 + W_3/Tg_3 + \dots + W_n/Tg_n$$

The A block segment and the B block segment are respectively important to the adhesive effect and the peeling strength of the adhesive layer. The A block segment having a lower glass transition temperature provides the adhesive layer to have the good adhesive effect. The B block segment having a higher glass transition temperature provides the adhesive layer with the low peeling strength. Therefore, the protective membrane of the present disclosure can overcome the shortcomings of a conventional protective membrane being difficult to be peeled off at high peeling rate.

In an exemplary embodiment, based on a total weight of the acrylic block copolymer being 100 wt %, and an amount of the A block segment ranges from 10 wt % to 20 wt %, and an amount of the B block segment ranges from 80 wt % to 90 wt %. Specifically, the amount of the A block segment can be 12 wt %, 14 wt %, 16 wt %, or 18 wt %. The amount of the B block segment can be 82 wt %, 84 wt %, 86 wt %, or 88 wt %. Within this ratio range, the adhesive layer formed from the adhesive composition is relatively easy to be peeled off.

The A block segment and the B block segment can be formed from different monomers. By adjusting contents of the monomers, the A block segment and the B block segment can have different properties.

In an exemplary embodiment, the A block segment and the B block segment are formed from the same monomers. In other words, the A block segment and the B block segment are formed from the aforementioned methacrylic monomer, the aforementioned acrylic monomer, and the aforementioned hydroxyl monomer. The difference between the A block segment and the B block segment is that the contents of the methacrylic monomer and the acrylic monomer are different.

By adjusting a weight ratio of the methacrylic monomer to the acrylic monomer, the A block segment and the B block segment can have different glass transition temperatures. The content of the methacrylic monomer forming the A block segment is lower than the content of the methacrylic monomer forming the B block segment, and the content of the acrylic monomer forming the A block segment is higher than the content of the acrylic monomer forming the B block segment.

Specifically, the A block segment includes 5 wt % to 15 wt % of the methacrylic monomer, 75 wt % to 90 wt % of the acrylic monomer, and 5 wt % to 10 wt % of the hydroxyl monomer.

In addition to the difference in structure between the methacrylic monomer and the acrylic monomer, the homopolymer polymerized from the methacrylic monomer and the homopolymer polymerized from the acrylic monomer also have different glass transition temperatures. The glass transition temperature of the homopolymer polymerized from the methacrylic monomer is higher than the glass transition temperature of the homopolymer polymerized from the acrylic monomer. Specifically, the glass transition temperature of the homopolymer polymerized from the methacrylic monomer ranges from 15° C. to 115° C., and the glass transition temperature of the homopolymer polymerized from the acrylic monomer ranges from −70° C. to 10° C.

The methacrylic monomer can be represented by a general formula of $CH_2{=}C(CH_3)COOR_2$, in which "$R_2$" is an alkyl group having 1 to 10 atoms. Specifically, the methacrylic monomer can be methyl methacrylate (Tg of the homopolymer being 105° C.), ethyl methacrylate (Tg of the homopolymer being 66° C.), n-butyl methacrylate (Tg of the homopolymer being 20° C.), isobutyl methacrylate (Tg of the homopolymer being 47° C.), glycidyl methacrylate (Tg of the homopolymer being 40° C.), tert-butyl methacrylate (Tg of the homopolymer being 107° C.), cyclohexyl methacrylate (Tg of the homopolymer being 105° C.), isobornyl methacrylate (Tg of the homopolymer being 110° C.), or a combination thereof. However, the present disclosure is not limited thereto.

The acrylic monomer can be represented by a general formula of $CH_2$=$CHCOOR_3$, in which "$R_3$" is an alkyl group having 1 to 18 atoms. The acrylic monomer can be methyl acrylate (Tg of the homopolymer being 10° C.), ethyl acrylate (Tg of the homopolymer being −21° C.), 2-ethylhexyl acrylate (Tg of the homopolymer being −55° C.), n-butyl acrylate (Tg of the homopolymer being −54° C.), or a combination thereof. However, the present disclosure is not limited thereto.

Supplementary illustration, the glass transition temperatures of the homopolymers polymerized from the monomers mentioned above are measured by a dynamic mechanical analyzer (DMA).

When a free radical is excited from the hydroxyl monomer, the hydroxyl monomer can provide a bridging point which can connect with the methacrylic monomer or the acrylic monomer. The hydroxyl monomer can be 2-hydroxyethyl acrylate, 2-hydroxyethyl methacrylate, or a combination thereof. However, the present disclosure is not limited thereto.

The crosslinker of the adhesive composition can have multi-functional groups so as to facilitate the cross-linking reaction. Specifically, the crosslinker can be an isocyanate compound having at least three isocyanate groups (—NCO). For example, the crosslinker can be hexamethylene diisocyanate (HDI), isophorone diisocyanate (IPDI), methylene diphenyl diisocyanate (MDI), olylene diisocyanate (TDI), or xylene diisocyanate (XDI).

The catalyst of the adhesive composition can be a metal chelate compound containing iron, titanium, or aluminum, such as ferric acetylacetonate, tris(2,4-hexanedione) titanium, tris(2,4-hexanedione)aluminum, or a combination thereof.

The solvent of the adhesive composition can be toluene (boiling point: 110.6° C.), propylene glycol methyl ether acetate (boiling point: 149° C.), ethyl acetate (boiling point: 77.1° C.), or other high boiling point solvents. For example, the boiling point of the solvent can range from 70° C. to 160° C.

In order to prove that the adhesive composition of the present disclosure can be used to form the protective membrane, a copolymer in Preparation Examples 1 to 4 can be polymerized according to the method below. The copolymer in Preparation Examples 1 to 4 is used to prepare the adhesive composition, so as to manufacture the protective membrane in Examples 1 and 2 and Comparative Examples 1 and 2.

Preparation Examples 1 to 4

According to the contents listed in Table 1, monomers to form the B block segment (the methacrylic monomer, the acrylic monomer, and the hydroxyl monomer), a solvent (ethyl acetate), and an initiator (azobisisobutyronitrile) are added into a glass reactor (to form a first reactant mixture). The first reactant mixture is stirred by a rate of 300 rpm and heated to a temperature ranging from 65° C. to 70° C. in an atmosphere of flowing nitrogen, so as to perform a first state reaction at a constant temperature. After 8 hours of reaction (a conversion rate being 95%), an intermediate product is obtained. A solid content of the intermediate product is 40 wt %, and a viscosity of the intermediate product ranges from 1500 cps to 2000 cps.

According to the contents listed in Table 2, monomers to form the A block segment (the methacrylic monomer, the acrylic monomer, and the hydroxyl monomer), a solvent (ethyl acetate), and an initiator (azobisisobutyronitrile) are added into the glass reactor and mixed with the intermediate product (to form a second reactant mixture). The second reactant mixture is stirred by a rate of 300 rpm and at a temperature ranging from 65° C. to 70° C., so as to perform a second state reaction in an atmosphere of flowing nitrogen. After 8 hours of reaction, a polymerizing product is obtained. A solid content of the polymerizing product is 35 wt %, and a viscosity of the intermediate product ranges from 2000 cps to 2500 cps. The solvent is removed, and then an acrylic copolymer (an acrylic block copolymer in Preparation Examples 2 and 3) is obtained.

The difference between the acrylic copolymers in Preparation Examples 1 to 4 is that the amounts of the A block segment and the B block segment are different. Specifically, the acrylic copolymer in Preparation Example 1 is completely polymerized from the monomers to form the A block segment, and the acrylic copolymer in Preparation Example 4 is completely polymerized from the monomers to form the B block segment. The acrylic block copolymer in Preparation Examples 2 and 3 includes the A block segment and the B block segment, while having different amounts. Specific amounts are listed in Table 3.

The amounts of the A block segment and the B block segment, the molecular weight of the acrylic copolymer, and the glass transition temperatures of the A block segment and the B block segment are listed in Table 3. The glass transition temperatures of the A block segment and the B block segment are measured by a dynamic mechanical analyzer.

TABLE 1

| Monomers to form B block segment (phr) | | Preparation Example 1 | Preparation Example 2 | Preparation Example 3 | Preparation Example 4 |
|---|---|---|---|---|---|
| Methacrylic monomer | Methyl methacrylate | — | 29 | 29 | 29 |
| Acrylic monomer | Methyl acrylate | — | 5 | 5 | 5 |
| | n-Butyl acrylate | — | 8 | 8 | 8 |
| | 2-Ethylhexyl acrylate | — | 50 | 50 | 50 |
| Hydroxyl monomer | 2-Hydroxyethyl acrylate | — | 8 | 8 | 8 |
| Initiator | Azobisisobutyronitrile | — | 0.1 | 0.1 | 0.1 |
| Solvent | Ethyl acetate | | 150 | 150 | 150 |
| Polymerization temperature | | | 70° C. | | |

TABLE 2

| Monomers to form A block segment (phr) | | Preparation Example 1 | Preparation Example 2 | Preparation Example 3 | Preparation Example 4 |
|---|---|---|---|---|---|
| Methacrylic monomer | Methyl methacrylate | 7 | 11 | 11 | — |
| Acrylic monomer | Methyl acrylate | 5 | 5 | 5 | — |
| | n-Butyl acrylate | 10 | 12 | 12 | — |
| | 2-Ethylhexyl acrylate | 70 | 64 | 64 | — |
| Hydroxyl monomer | 2-Hydroxyethyl acrylate | 8 | 8 | 8 | — |
| Initiator | Azobisisobutyronitrile | 0.1 | 0.1 | 0.1 | — |
| Solvent | Ethyl acetate | 150 | 150 | 150 | — |
| Polymerization temperature | | | 70° C. | | |

TABLE 3

| | Preparation Example 1 | Preparation Example 2 | Preparation Example 3 | Preparation Example 4 |
|---|---|---|---|---|
| Weight ratio of A block segment/B block segment | 100/0 | 10/90 | 20/80 | 0/100 |
| Molecular weight of polymerizing product (g/mol) | 520,000 | 400,000 | 460,000 | 480,000 |
| Glass transition temperature of A block segment (° C.) | −14 | −14 | −14 | — |
| Glass transition temperature of B block segment (° C.) | — | 16 | 16 | 16 |

Examples 1 and 2

In Examples 1 and 2, appropriate amounts of a crosslinker (hexamethylene diisocyanate, such as Bayer® N3300), a catalyst, and a solvent (ethyl acetate) are added into the acrylic block copolymer in Preparation Examples 2 and 3 to form an adhesive composition. Relative to 100 parts by weight of the acrylic block copolymer, an amount of the crosslinker is 10 parts by weight, an amount of the catalyst is 0.4 parts by weight, and an amount of the solvent is 90 parts by weight.

The adhesive composition is coated onto a PET substrate layer (thickness: 12 μm, model: BH216 provided by Nan Ya Plastics), and the adhesive composition is covered by a PET separating layer. After being dried, an adhesive layer to connect the PET substrate layer and the PET separating layer is formed from the adhesive composition. A protective membrane is obtained.

In order to measure the peeling strength of the protective membrane, after removing the separating layer, the adhesive layer contacts and is attached to a printed circuit board which is coated by a solder mask, and is heat-pressed by a roller at 60° C., as shown in FIG. 3. A peeling strength of the protective membrane is measured at 25° C. by a universal testing machine under a peeling angle of 180°. The result is listed in Table 4.

Comparative Examples 1 and 2

The protective membrane in Comparative Examples 1 and 2 are manufactured by a similar method in Examples 1 and 2. The difference is that the acrylic copolymer in Preparation Examples 1 and 4 are used to form the adhesive layer. The peeling strength of the protective membrane is also measured at 25° C. by a universal testing machine under a peeling angle of 180°. The result is listed in Table 4.

TABLE 4

| (g/inch) | Comparative Example 1 | Example 1 | Example 2 | Comparative Example 2 |
|---|---|---|---|---|
| Peeling strength measured at peeling rate of 0.3 m/min | 78 | 64 | 69 | 51 |
| Peeling strength measured at peeling rate of 2.4 m/min | 113 | 53 | 49 | 28 |

According to Tables 1 to 4, the peeling strength of the adhesive layer formed from the adhesive composition of the present disclosure measured at a low peeling rate (0.3 m/min) is higher than the peeling strength measured at a high peeling rate (2.4 m/min). Therefore, the protective membrane of the present disclosure can be quickly and easily peeled off after use without destroying the solder mask on the printed circuit board and bending the printed circuit board.

According to the results in Examples 1 and 2, the peeling strength of the protective membrane of the present disclosure peeled at a high peeling rate (2.4 m/min) is lower than 80 g/inch, lower than 60 g/inch, or preferably lower than 55 g/inch.

According to the experimental results, when the glass transition temperature of the B block segment is lower than or equal to an operating temperature, stick slip instability can occur when the protective membrane is peeled. Accordingly, the peeling strength of the protective membrane decreases along with an increasing peeling rate, as shown in Examples 1 and 2.

According to Comparative Example 1, when the glass transition temperature of the acrylic copolymer is low, the adhesive layer has a good adhesive effect. However, the peeling strength of the protective membrane increases along with an increasing peeling rate, which is not suitable for a rapid removal of the protective membrane. According to the results in Table 4, when the peeling rate increases, the peeling strength also increases. Therefore, in order to ensure the integrity of the printed circuit board, the protective membrane should be peeled at a low peeling rate which is inconvenient to use.

According to Comparative Example 2, when the glass transition temperature of the acrylic copolymer is high, the adhesive layer has a poor adhesive effect. While the protective membrane can be quickly peeled off, this configuration is not beneficial to being attached on the printed circuit board. Before an exposure process, a silicon roller is used to remove dust on the protective membrane so as to prevent dust from affecting an exposure effect. In general, an adhesive force of the silicone roller is approximately 30 g/inch. If the peeling strength of the protective membrane is too low, the protective membrane will be stuck by the silicon roller. In Comparative Example 2, an edge of the protective membrane is occasionally lifted during the dust-removing process, which causes a poor usability.

Beneficial Effects of the Embodiment

In conclusion, in the protective membrane and the adhesive composition provided by the present disclosure, by virtue of "the adhesive composition including the acrylic block copolymer which has the A block segment and the B block segment," and "the glass transition temperature of the A block segment being lower than the glass transition temperature of the B block segment," the protective membrane can have good adhesive force and can be peeled at a high peeling rate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adhesive composition, comprising:

an acrylic block copolymer polymerized from a methacrylic monomer, an acrylic monomer, and a hydroxyl monomer through free radical two-stage polymerization;

wherein a glass transition temperature of a homopolymer polymerized from the methacrylic monomer is higher than a glass transition temperature of a homopolymer polymerized from the acrylic monomer;

wherein the acrylic block copolymer contains an A block segment and a B block segment, and a single acrylic block copolymer includes the A block and the B block formed by free radical two-stage polymerization;

wherein a content of the methacrylic monomer in the A block segment is lower than a content of the methacrylic monomer in the B block segment, and a content of the acrylic monomer in the A block segment is higher than a content of the acrylic monomer in the B block segment;

a crosslinker; and a catalyst;

wherein, relative to 100 parts by weight of acrylic block copolymer, an amount of the crosslinker ranges from 1 part by weight to 10 parts by weight, and an amount of the catalyst ranges from 0.001 parts by weight to 0.05 parts by weight.

2. The adhesive composition according to claim 1, wherein a glass transition temperature of the A block segment ranges from −40° C. to −10° C.

3. The adhesive composition according to claim 1, wherein a glass transition temperature of the B block segment ranges from 10° C. to 25° C.

4. The adhesive composition according to claim 1, wherein, based on a total weight of the acrylic block copolymer being 100 wt %, an amount of the A block segment ranges from 10 wt % to 20 wt %, and an amount of the B block segment ranges from 80 wt % to 90 wt %.

5. The adhesive composition according to claim 1, wherein the glass transition temperature of the homopolymer polymerized from the methacrylic monomer ranges from 15° C. to 115° C., and the glass transition temperature of the homopolymer polymerized from the acrylic monomer ranges from −70° C. to 10° C.

6. The adhesive composition according to claim 1, wherein the methacrylic monomer is selected from the group consisting of: methyl methacrylate, ethyl methacrylate, n-butyl methacrylate, isobutyl methacrylate, glycidyl methacrylate, tert-butyl methacrylate, cyclohexyl methacrylate, and isobornyl methacrylate.

7. The adhesive composition according to claim 1, wherein the acrylic monomer is selected from the group consisting of: methyl acrylate, ethyl acrylate, 2-ethylhexyl acrylate, and n-butyl acrylate.

8. The adhesive composition according to claim 1, wherein the hydroxyl monomer is selected from the group consisting of: 2-hydroxyethyl acrylate and 2-hydroxyethyl methacrylate.

9. The adhesive composition according to claim 1, wherein the A block segment is formed from 5 wt % to 15 wt % of the methacrylic monomer, 75 wt % to 90 wt % of the acrylic monomer, and 5 wt % to 10 wt % of the hydroxyl monomer.

10. The adhesive composition according to claim 1, wherein the B block segment is formed from 25 wt % to 35 wt % of the methacrylic monomer, 45 wt % to 70 wt % of the acrylic monomer, and 5 wt % to 10 wt % of the hydroxyl monomer.

11. The adhesive composition according to claim 1, wherein a number average molecular weight of the acrylic block copolymer ranges from 300,000 g/mol to 500,000 g/mol.

12. The adhesive composition according to claim 1, wherein a polymer dispersity index of the acrylic block copolymer ranges from 1.5 to 5.

13. A protective membrane, comprising:

a substrate layer;

an adhesive layer formed from the adhesive composition as claimed in claim 1; and a separating layer;

wherein the adhesive layer is disposed between the substrate layer and the separating layer.

14. The protective membrane according to claim 13, wherein a thickness of the adhesive layer ranges from 2 μm to 20 μm.

15. The protective membrane according to claim 13, wherein, at an operating temperature of 25° C., a peeling strength of the protective membrane peeled at 0.3 m/min is higher than a peeling strength of the protective membrane peeled at 2.4 m/min.

* * * * *